Sept. 14, 1965  E. P. O. BOOTH ETAL  3,206,045
CONVEYOR BELT FEEDING MECHANISMS
Filed Jan. 21, 1964  4 Sheets-Sheet 4

3,206,045
CONVEYOR BELT FEEDING MECHANISMS
Edmond Percival Otto Booth and Eugene Winscom
Innes, both of Johannesburg, Transvaal, Republic of
South Africa, assignors to Edward L. Bateman Limited,
Johannesburg, Transvaal, Republic of South Africa, a
South African company
Filed Jan. 21, 1964, Ser. No. 339,259
8 Claims. (Cl. 214—17)

This invention relates to feeding mechanisms for conveyor belts and other equipment requiring feeding from a stock-pile or bin. In view of the fact that the invention is primarily concerned with feeding conveyor belts, the term "conveyor belt" will be used in this specification with a slightly extended meaning. It is intended to cover anything accepting comminuted material swept off a shelf for transport elsewhere.

In the art of feeding comminuted material such as ore on to a belt from a storage bin or pile two well known systems exist.

According to one of these known arrangements a tunnel is provided under the bin and one or more gate controlled apertures in the tunnel serve to feed material on to a conveyor belt below the apertures. A supplementary conveyor belt or feeder may be used to guide material from each gate on to a main belt.

This system has various disadvantages, among which mention might be made of the tendency material has to form pipes in the bin and that the apertures have to be fairly widely spaced in order not to weaken the roof of the tunnel. Further, the tunnel has to be of substantial dimensions in order to accommodate chutes for leading material from the apertures on to the conveyor belt.

The other well known system is one in which a shelf is provided which is supplied with material through a series of apertures, the material taking up its natural position of repose on the shelf. A rotating plough in the form of a hub with a series of spaced vanes passes up and down the shelf shovelling material onto the conveyor belt. The chief disadvantages of this system are (a) that a large width of tunnel is required to accommodate the plough and (b) due to the rotating nature of the plough, rock material has a tendency to become jammed between the vane tips and the shelf.

An object of the present invention is to provide a feeding mechanism in which most, if not all, of the disadvantages of the known systems are at least minimized.

According to the present invention a feeding mechanism for sweeping comminuated material off a shelf on to a conveyor belt includes a carriage which is adapted to be mounted on a track extending along the conveyor belt, the carriage further being adapted for draught force to be applied thereto to propel it to and fro along the track; and at least one sweeping arm with a sweeping face to each side thereof and mounted on the carriage for pivotal movement about an axis disposed transversely to the shelf between two extreme operating positions in each of which the arm has the correct lie for a particular direction of travel of the carriage to urge material off the shelf and on to the belt, the sweeping arm being adapted for both faces thereof to be located in the material mass during operative runs of the carriage in both directions, draught force applied to the carriage in one direction during a run acting to hold the arm in the one extreme position appropriate for that direction of travel and draught force applied in the opposite direction at the start of a new run acting to urge the arm to the other extreme position.

The carriage may remain stationary during pivotal movement of the arm from the one to the other extreme position at the start of a run. Alternatively, at least some movement of the carriage along the conveyor belt may occur during change over of the arm from one extreme position to the other.

The sweeping arm is preferably mounted on the carriage for pivotal movement about an axis disposed substantially perpendicular to the shelf.

The feeding mechanism may include one or more ropes, chains or other flexible draught elements arranged to act directly or indirectly on the sweeping arm and to exert draught force on the carriage.

A pivotally mounted control arm may be connected directly or indirectly to the sweeping arm and adapted for draught force to be applied thereto in a position spaced laterally from the pivotal axis thereof, draught force applied to the control arm in one direction during a run of the carriage acting to hold the sweeping arm in the one extreme position appropriate for that direction of travel and draught force applied to the control arm in the opposite direction at the start of a new run of the carriage acting to urge the sweeping arm to the other extreme position.

A plurality of sweeping arms each with a sweeping face to each side thereof may be mounted pivotally on the carriage in spaced relationship along the belt, the arms being coupled together for simultaneous movement about their pivots.

In one arrangement, the feeding mechanism may include a toothed gear member for each sweeping arm, each gear member being connected to its sweeping arm for rotational movement therewith; a common toothed gear member adapted to be coupled to both sweeping arm gear members for rotational movement therewith; and a common control arm connected to the common gear member for rotational movement therewith; the control arm extending laterally from the rotational axis of the common gear member and adapted for a draught element to act thereon in a position spaced laterally from the rotational axis of the common gear member.

The teeth of the common gear member may mesh directly with the teeth of the two sweeping arm gear members.

Alternatively, the common gear member and the two sweeping arm gear members may be in the nature of sprockets coupled together by a chain.

In another arrangement, a separate control arm is connected to each sweeping arm for pivotal movement therewith, each control arm extending laterally from the pivotal axis of its sweeping arm; and means is provided for coupling the control arms together to ensure simultaneous pivotal movement of the sweeping arms, the coupling means being adapted for a draught element to act thereon.

It is a further feature of the invention that means is provided whereby the or each sweeping arm is permitted a degree of vertical movement relative to the shelf, the sweeping arm being biassed into a position of minimum clearance with the shelf. This feature enables the sweeping arm to yield under the influence of chips of stone or the like jammed between the sweeping arm and the shelf.

Preferred embodiments of the invention will now be described by way of example with reference to the accompanying drawings in which.

Figure 1:
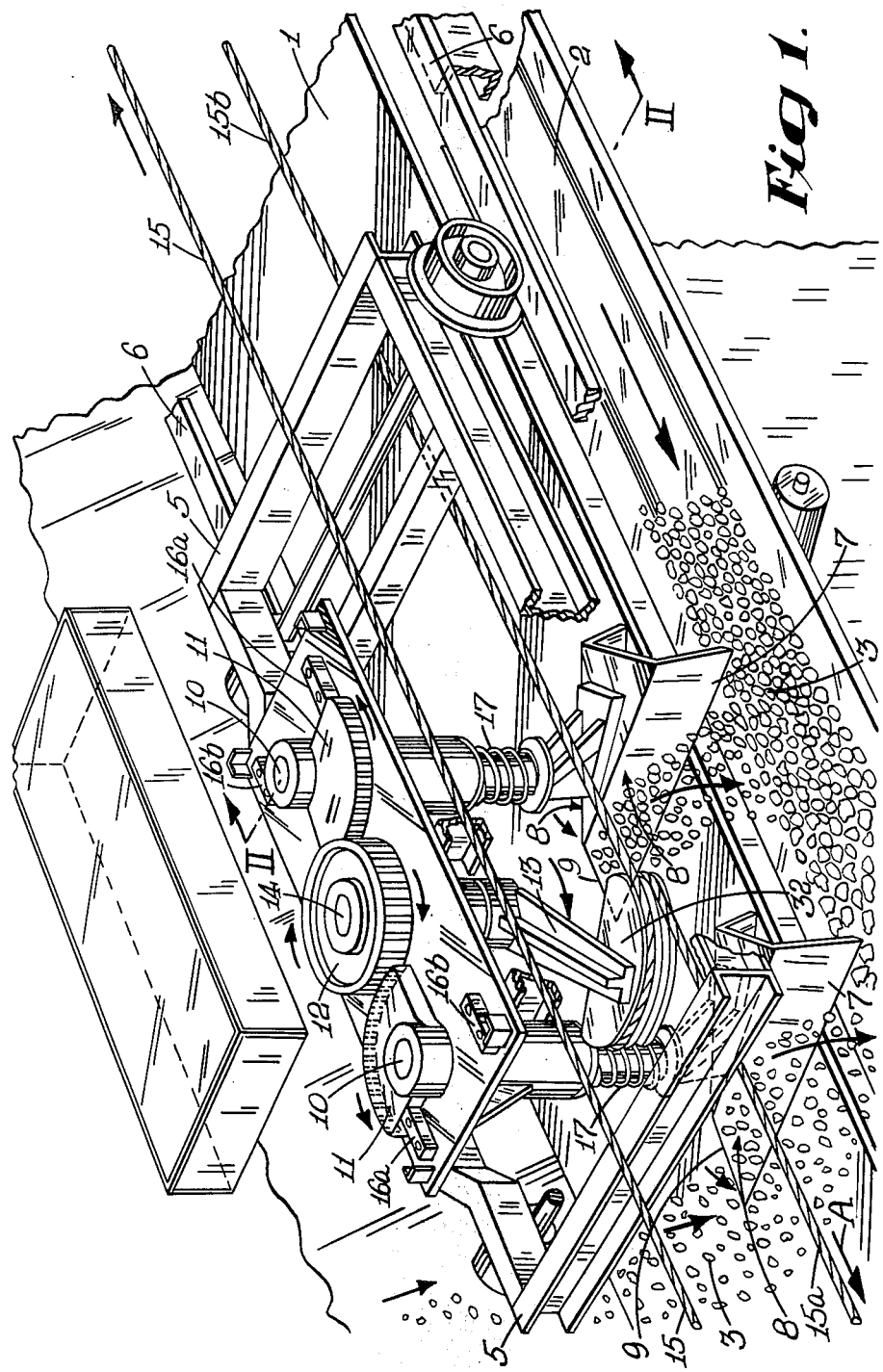
FIGURE 1 is a perspective view of one embodiment of a feeding mechanism according to the invention in which a common control arm is employed for a plurality of sweeping arms.
Figure 2:
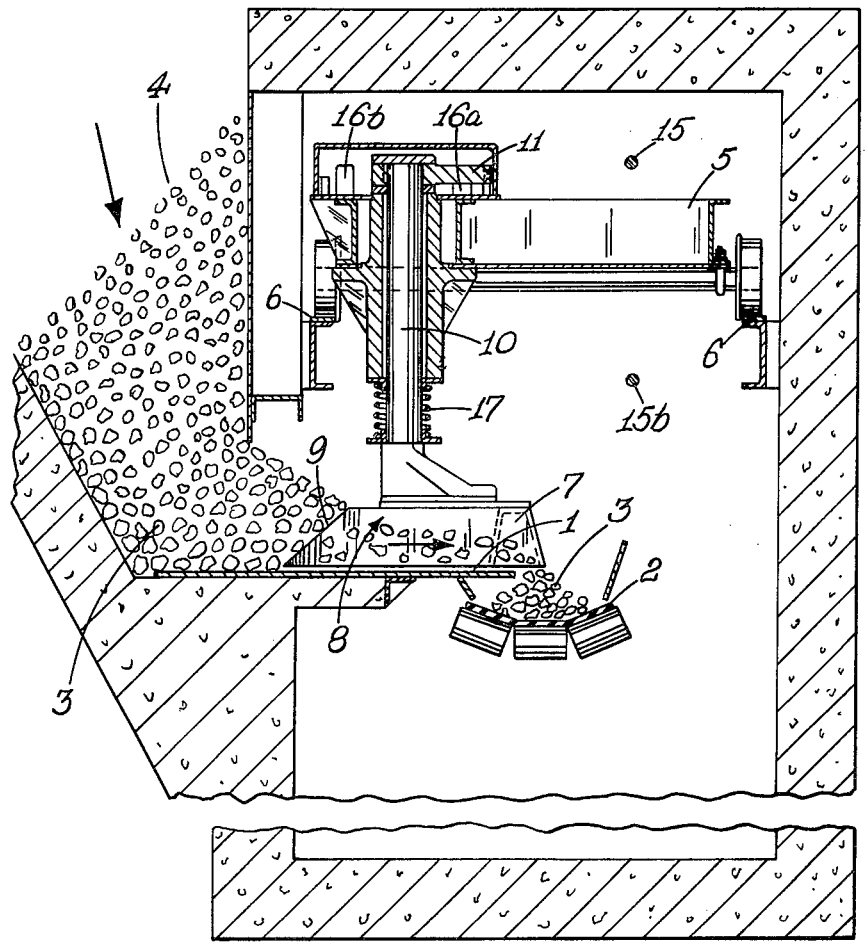
FIGURE 2 is a section on line II—II in FIGURE 1.
Figure 3:
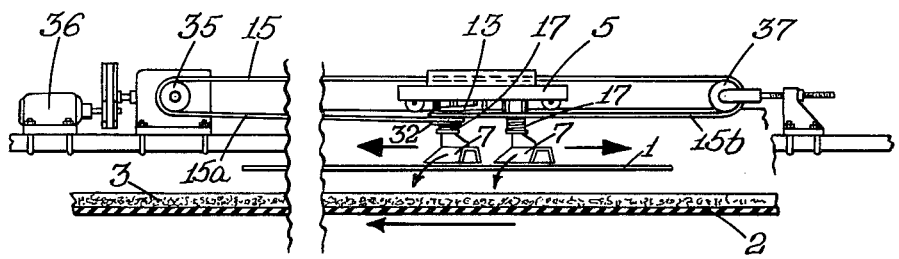
FIGURE 3 is a side elevational view to a smaller scale of the feeding mechanism of FIGURES 1 and 2 showing the winding arrangement of the draught element.

Referring to FIGURES 1 to 3, horizontal shelf 1 is located in suitable position above conveyor belt 2 and is arranged constantly to be fed with comminuted material 3 from a storage pile 4. Material 3 spills across shelf 1 and lies at its natural angle of repose ready to be swept off the shelf on to belt 2. As material moves off shelf 1 further material passes from storage pile 4 on to shelf 1.

Wheeled carriage 5 is movable to and fro along belt 2 on guide rails 6 which run parallel to belt 2. Two sweeping arms 7 in the nature of plough shares are rigidly mounted on spindles 10 which, in turn are mounted on carriage 5 for rotational movement relative to carriage 5 about vertical axes, arms 7 being spaced apart longitudinally along conveyor belt 2. Each sweeping arm 7 has a sweeping face 8 to each side thereof and is shaped to flare rearwardly and outwardly from a bow zone 9, the line of the bow zone facing upwardly and being swept backwards at an acute angle. Sweeping arms 7 are arranged to sweep over the top of shelf 1 and to urge material off shelf 1 on to conveyor belt 2 during travel of carriage 5 along conveyor belt 2.

A gear toothed quadrant 11 is secured to each vertical spindle 10 for rotational movement therewith. Common gear toothed wheel 12 is rotatably mounted between quadrants 11 and meshes directly with both quadrants 11.

Quadrants 11 and gear wheel 12 couple the two sweeping arms 7 together for simultaneous rotational movement on spindles 10. Stop members 16a, 16b are provided to engage quadrants 11 to limit movement of sweeping arms 7 between two extreme positions. Sweeping arms 7 are thus mounted on carriage 5 for pivotal movement between two extreme operating positions in each of which arms 7 have the correct position for a particular direction of travel of carriage 5.

Common control arm 13 is connected through spindle 14 to common gear wheel 12 for rotational movement therewith. As shown, control arm 13 extends laterally from the rotational axis of spindle 14. Rope 15 encircles grooved engagement formation 32 which is secured on the outer end of control arm 13 in spaced relationship to the rotational axis of spindle 14. Rope 15 engages formation 32 in non-slip fashion and rope sections 15a, 15b extend in opposite directions away from carriage 5.

As can be seen from FIGURE 3, rope 15 is continuous and passes around winding drum 35 which is arranged to be rotatably driven by motor 36, and around idler drum 37. Drums 35 and 37 are suitably located towards opposite ends of shelf 1. By rotation of winding drum 35 in the one or the other direction, either one of rope sections 15a, 15b is hauled in while the other rope section is paid out so that draught force is applied to either one of rope sections 15a, 15b. Draught force applied to rope sections 15a, 15b is transmitted through control arm 13 to carriage 5 to propel the latter along conveyor belt 2 in the one or the other direction as required.

When sweeping arms 7 are in the one extreme position shown in FIGURE 1, which is appropriate for travel of carriage 5 in the direction of arrow A, sweeping arms 7 lie at an angle to the direction of arrow A but point generally in that direction. When draught force is applied to rope section 15a in the direction of arrow A by rotating winding drum 35 in the appropriate direction, the action of rope 15 on control arm 13 causes carriage 5 to be pulled in the direction of arrow A and sweeping arms 7 to be held in the appropriate extreme position in which quadrants 11 engage stop members 16a.

At the end of a run of carriage 5 in the direction of arrow A, rotation of winding drum 35 is reversed to apply draught force to rope section 15b for a run of carriage 5 in the direction opposite to arrow A. Draught force on rope section 15b acts on control arm 13 and through the coupling of gear wheel 12 and quadrants 11 urges sweeping arms 7 to the other extreme position in which quadrants 11 engage stop-members 16b. Carriage 5 may remain stationary while change-over of the positions of sweeping arms 7 occurs, carriage 5 only starting its new run upon completion of the change-over when the quadrants 11 engage the stop-members 16b. It is also possible for movement of carriage 5 on the new run to occur during the change-over. After completion of the change-over, carriage 5 moves along conveyor belt 2 with sweeping arms 7 in the new extreme position in which sweeping arms 7 lie at an angle to the new direction of travel of carriage 5 but point generally in that direction.

It is an important feature of the invention that both sweeping faces 8 of each sweeping arm 7 are located in the material mass on shelf 1 during operative runs of carriage 5 in both directions. Unless sweeping arms 7 pass out of the region of shelf 1 at the end of an operative run, both faces 8 of each sweeping arm 7 remain in the material mass during change-over from one extreme position to the other. As a result, sweeping arms 7 do not have to be urged into and out of the material mass, thus minimizing the forces applied to the feeding mechanism.

Apart from being rotationally mounted on carriage 5, spindles 10 are slidable up and down relative to carriage 5.

Sweeping arms 7 are thus permitted a degree of vertical movement relative to shelf 1. Springs 17 bias sweeping arms 7 into a position of minimum clearance with shelf 1. It will be appreciated that sweeping arms 7 can yield under the influence of chips of stone or the like jammed between sweeping arms 7 and shelf 1.

Figure 4:
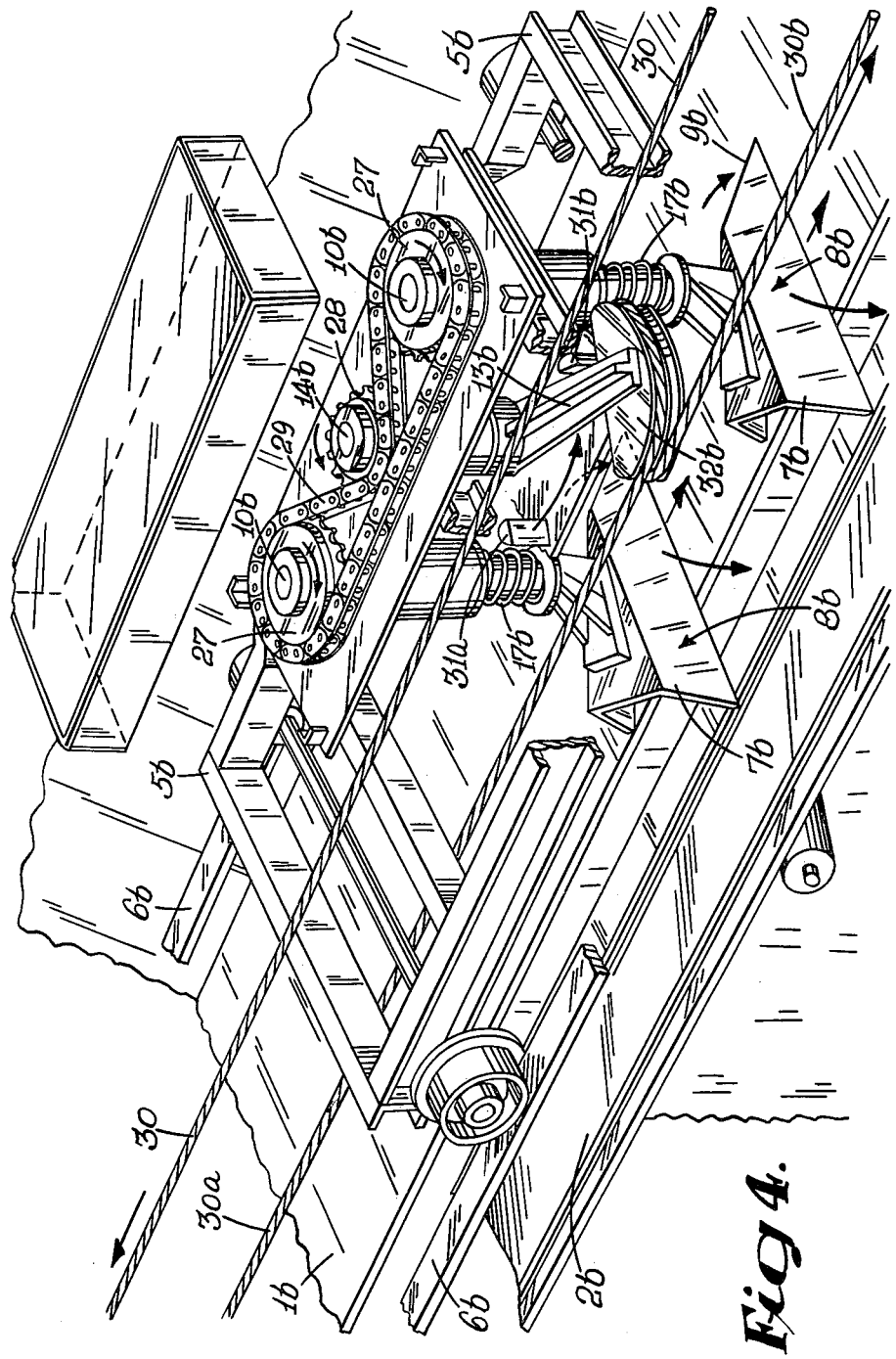
FIGURE 4 is a perspective view of another embodiment of a feeding mechanism according to the invention in which a common control arm is employed for a plurality of sweeping arms.

The arrangement of figure 4 is similar to that of figures 1 to 3, with the exception that instead of directly meshing quadrants 11 and gear wheel 12, a pair of sprockets 27 are connected to sweeping arm spindles 10b for rotational movement therewith, common sprocket 28 is connected to common control arm 13b for rotational movement therewith, and chain 29 couples sprockets 27, 28 together. Sprockets 27, 28 and chain 29 couple sweeping arms 7b together for simultaneous pivotal movement.

Rope 30 engages formation 32b on common control arm 13b and stop members 31a, 31b engageable by control arm 13b, are provided to limit the movement of sweeping arms 7b between the two extreme positions.

Depending on the direction of the draught force applied to control arm 13b, common sprocket 28 will be rotated and/or held in position to cause, through the coupling with sprockets 27 connected to sweeping arms 7b, suitable pivotal movement and/or retention of sweeping arms 7b as required.

Figure 5:
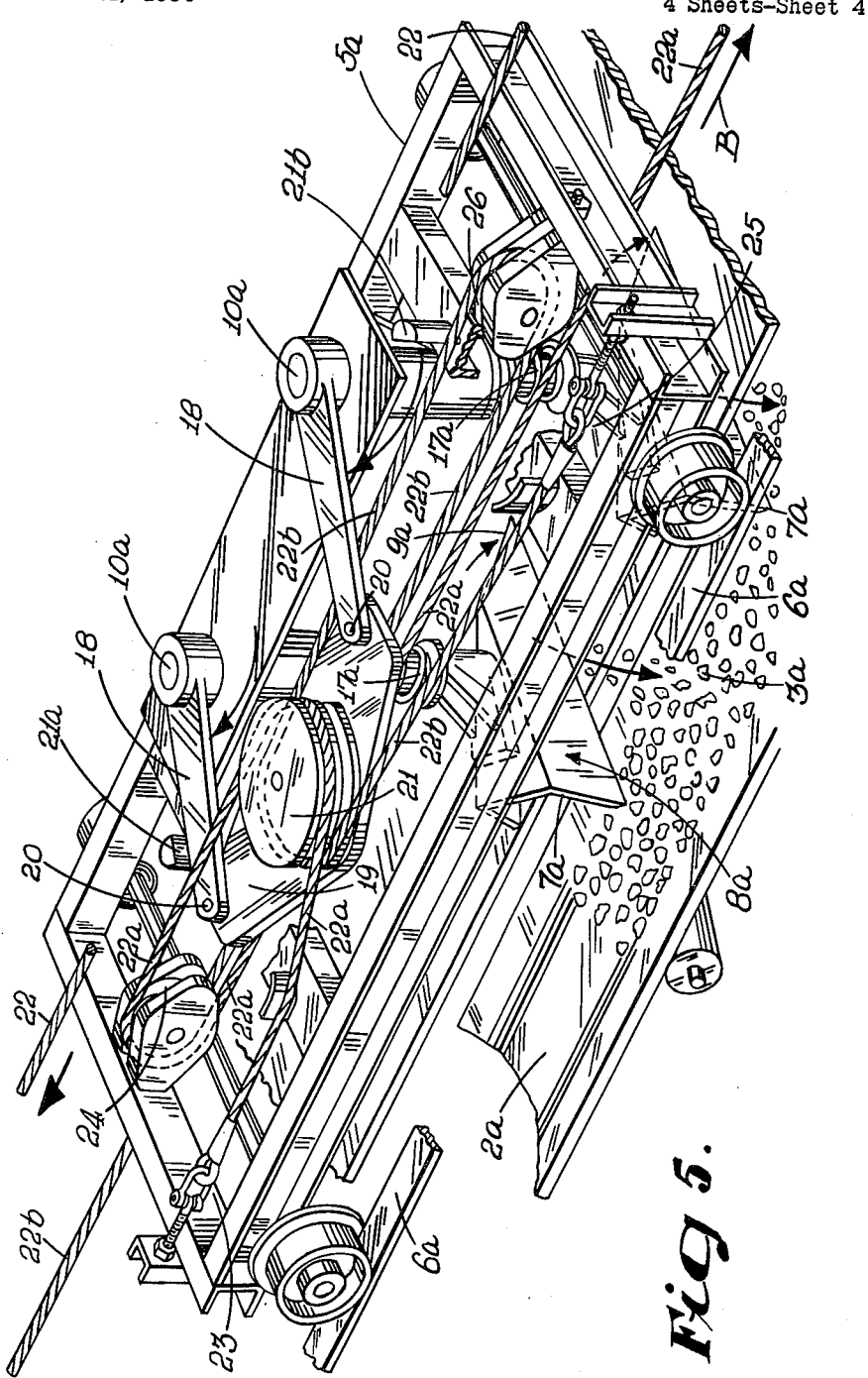
FIGURE 5 is a perspective view (with parts omitted for the sake of clarity) of an embodiment of a feeding mechanism according to the invention in which a separate control arm for each of a plurality of sweeping arms is employed.

Referring now to FIGURE 5, the arrangement is very similar to that of FIGURES 1 to 3, but instead of a common control arm, a separate laterally extending control arm 18 is connected to each sweeping arm spindle 10a for pivotal movement therewith. Towards their outer ends, control arms 18 are conencted together by coupling plate 19 to ensure simultaneoeus pivotal movement of sweeping arms 7a. Control arms 18 are pivotally connected to coupling plate 19 by means of pins 20. Stop members 21a, 21b are provided to engage control arms 18 to limit the movement of sweeping arms 7a between the two extreme positions.

A double sheave pulley 21 is mounted on coupling plate 19 between control arms 18. Rope section 22a is secured at one end to carriage 5a at 23, passes around one sheave of pulley 21 and around pulley 24 mounted on carriage 5a, to extend away from carriage 5a in the directin of arrow B parallel to conveyor belt 2a. Rope section 22b is secured at one end to carriage 5a at 25 and passes in opposite arrangement to rope section 22a around the other sheave of pulley 21 and around second pulley 26 mounted on carriage 5a, to extend away from carriage 5a in opposite direction to arrow B.

When sweeping arms 7a are in the one extreme position shown in FIGURE 5 which is appropriate for travel of carriage 5a in the direction of arrow B, sweeping arms 7a lie at an angle to the direction of arrow B but point generally in that direction. The arrangement of rope sections 22a, 22b round pulleys 21, 24, 26 is such that when rope section 22a extending from carriage 5a in the direction of arrow B, is hauled in to apply draught force to rope section 22a, the action of rope section 22a on pulley 21 causes carriage 5a to be pulled in the direction of arrow B and sweeping arms 7a to be held in the appropriate extreme position shown in which the one control arm 18 engages stop member 21a.

At the end of a run of carriage 5a in the direction of arrow B, the hauling in and paying out of sections 22a, 22b are reversed for a run in the opposite direction. When hauling in of rope section 22b commences to apply draught force thereto, rope section 22b acts on double sheave pulley 21 and urges sweeping arms 7a to the other extreme position in which the other control arm 18 engages stop member 21b. Carriage 5a may remain stationary while change-over of the positions of sweeping arms 7a occurs, carriage 5a only starting its new run upon completion of the changeover. It is also possible for movement of carriage 5a on the new run to occur during the change-over. After completion of the change-over, carriage 5a moves along conveyor 2a with sweeping arms 7a held in the new extreme position.

It will be appreciated that many variations in detail are possible without departing from the scope of the appended claims. For example, one or more draught elements may be arranged in any other suitable manner to act directly or indirectly on the sweeping arms and to exert draught force on the carriage. Any other suitable arrangement may be used to haul in and pay out the draught element or elements in order to apply draught force. Also, the control arm or arms may be connected directly or indirectly in any other suitable manner to the sweeping arm or arms.

Furthermore, instead of the shelf being horizontal, it may be inclined at any suitable angle in any suitable direction as required. It is preferable for the sweeping arms to be mounted on the carriage for pivotal movement about axes disposed substantially perpendicular to the shelf, but the pivotal axes may also be disposed transversely to the shelf at any suitable angular disposition relative to the shelf other than perpendicular.

Instead of a plurality of interconnected sweeping arms, only one sweeping arm may be used.

What is claimed is:

1. A feeding mechanism for sweeping comminuted material off a shelf onto a conveyor belt, the mechanism comprising a track extending along the conveyor belt, a carriage mounted on the track for movement along the track in opposite directions, at least one sweeping arm having a pair of respective sides with a sweeping face thereon, said arm being mounted on the carriage for pivotal movement about an axis disposed transversely to the shelf between two extreme operating positions in each of which the arm assumes a specific position for a respective direction of travel of the carriage to urge material off the shelf and onto the conveyor belt, the sweeping arm being adapted for both faces thereof to be located in the material mass during operative runs of the carriage in both directions, and a control arm connected to the sweeping arm for pivotal movement about an axis, said control arm being adapted for having draught force applied thereto in opposite directions at a position spaced laterally from the pivotal axis of the control arm with the sweeping arm such that the draught force applied to the control arm in one direction during a run of the carriage is effective to propel the carriage along the track in that direction and to hold the sweeping arm in a corresponding extreme position appropriate for that direction of travel, whereas with the draught force applied to the control arm in the opposite direction at the start of a new run of the carriage the sweeping arm is urged to the other extreme position thereof and to propel the carriage along the track in the opposite direction.

2. A feeding mechanism as claimed in claim 1, in which the sweeping arm is mounted on the carriage for pivotal movement about an axis disposed substantially perpendicular to the shelf.

3. A feeding mechanism as claimed in claim 1, comprising means whereby the sweeping arm is permitted a degree of vertical movement relative to the shelf, the sweeping arm being biased into a position of minimum clearance with the shelf.

4. A feeding mechanism as claimed in claim 1, including at least one further sweeping arm mounted pivotally on the carriage in spaced relationship along the belt with respect to the first said sweeping arm, and means coupling the sweeping arms together for simultaneous movement each about its respective pivotal axis.

5. A feeding mechanism as claimed in claim 1, including at least one further sweeping arm mounted pivotally on the carriage in spaced relationship along the belt with respect to the first said sweeping arm, the sweeping arms being coupled together for simultaneous pivotal movement; a toothed gear member for each sweeping arm, each gear member being connected to its respective sweeping arm for rotational movement therewith; a common toothed gear member adapted to be coupled to each sweeping arm gear member for rotational movement therewith; said control arm being connected to the common gear member for rotational movement therewith, the control arm extending laterally from the rotational axis of the common gear member such that the draught element is adapted to act thereon in a position spaced laterally from the rotational axis of the common gear member.

6. A feeding mechanism as claimed in claim 5, in which the teeth of the common gear member mesh directly with the teeth of the sweeping arm gear members.

7. A feeding mechanism as claimed in claim 5, in which the common gear member and the sweeping arm gear members are sprocket gears, the mechanism further comprising a chain in driving engagement with the gear members.

8. A feeding mechanism for sweeping comminuted material off a shelf onto a conveyor belt, the mechanism comprising a track extending along the conveyor belt, a carriage mounted on the track for movement along the track in opposite directions, a plurality of sweeping arms each having a pair of respective sides with a sweeping face thereon, said arms being mounted on the carriage in spaced relationship along the belt each for pivotal movement about a respective axis disposed transversely to the shelf, each said sweeping arm being pivotally movable between two extreme operating positions in each of which the arm assumes a specific position for a respective direction of travel of the carriage to urge material off the shelf and onto the conveyor belt, a separate control arm connected to each sweeping arm for pivotal movement therewith, each control arm extending laterally from the pivotal axis of its respective sweeping arm; coupling means connecting the control arms together to pivotally displace the same and the sweeping arms therewith simultaneously in response to the application of draught forces to said coupling means such that with draught force applied to the coupling means in one direction during a run of the carriage the sweeping arms assume the extreme position corresponding to that direction of travel, whereas with draught force applied to the coupling means in the opposite direction at the start of a new run of the carriage the sweeping arms are urged to the other extreme position thereof.

References Cited by the Examiner
UNITED STATES PATENTS
3,077,995   2/63   Booth et al.

GERALD M. FORLENZA, *Primary Examiner.*
HUGO O. SCHULZ, *Examiner.*